US007279173B2

(12) United States Patent
Schiestel et al.

(10) Patent No.: US 7,279,173 B2
(45) Date of Patent: Oct. 9, 2007

(54) OBJECT HAVING A MICROBICIDE COATING, METHOD FOR THE PRODUCTION THEREOF AND USE OF THE SAME

(75) Inventors: Thomas Schiestel, Stuttgart (DE); Hermann Schirra, Saarbruecken (DE); Helmut Schmidt, Saarbruecken-Guedingen (DE); Detmar Buxmann, Saarbruecken (DE)

(73) Assignees: Leibniz-Institut Fuer Neue Materialien Gemeinnuetzige GmbH, Saarbruecken (DE); Ursapharm Arzneimittel GmbH & Co. KG, Saarbruecken (DE)

( * ) Notice: Subject to any disclaimer, the term of this patent is extended or adjusted under 35 U.S.C. 154(b) by 503 days.

(21) Appl. No.: 10/415,396

(22) PCT Filed: Jul. 13, 2001

(86) PCT No.: PCT/EP01/08167

§ 371 (c)(1),
(2), (4) Date: Apr. 28, 2003

(87) PCT Pub. No.: WO02/36701

PCT Pub. Date: May 10, 2002

(65) Prior Publication Data

US 2004/0029834 A1 Feb. 12, 2004

(30) Foreign Application Priority Data

Nov. 2, 2000 (DE) .............................. 100 54 248

(51) Int. Cl.
*A01N 25/10* (2006.01)
*A01N 59/16* (2006.01)
(52) U.S. Cl. ...................................... 424/421; 424/618
(58) Field of Classification Search ................ 424/405, 424/486; 522/172; 427/487, 387
See application file for complete search history.

(56) References Cited

U.S. PATENT DOCUMENTS 4,571,365 A 2/1986 Ashlock et al.
5,246,979 A 9/1993 Lutz et al.
5,593,781 A 1/1997 Nass et al.
5,644,014 A 7/1997 Schmidt et al.
6,291,070 B1 9/2001 Arpac et al.
6,653,043 B1 * 11/2003 Hanabata ................. 430/270.1

FOREIGN PATENT DOCUMENTS

| DE | 4118184 | 12/1992 |
|---|---|---|
| DE | 4212633 | 10/1993 |
| DE | 4329279 | 3/1995 |
| DE | 19746885 | 6/1999 |
| DE | 19935230 | 2/2001 |
| EP | 0459003 | 12/1991 |
| EP | 0518142 | 12/1992 |
| JP | 2-264074 | 10/1990 |
| JP | 8-27404 | 1/1996 |
| JP | 10-36713 | 2/1998 |
| JP | 10-279885 | 10/1998 |
| WO | WO93/21127 | 10/1993 |
| WO | WO98/51747 | 11/1998 |

OTHER PUBLICATIONS

Hackh's Chemical Dictionary—pp. 168,171—1972.*
English Language Abstract of JP No. 10-36713.
English Language Abstract of JP No. 10-279885.
English Language Abstract of JP No. 2-264074.
English Language Abstract of JP No. 8-27404.
English Language Abstract of DE No. 4329279.

* cited by examiner

*Primary Examiner*—Neil S. Levy
(74) *Attorney, Agent, or Firm*—Greenblum & Bernstein, P.L.C.

(57) ABSTRACT

A microbicidally coated article, especially a container, having on at least part of it a coating comprising an organically modified inorganic matrix comprising silver colloids which is obtainable by application of a coating composition comprising a) a hydrolysate or condensate based on at least one hydrolysable silane with at least one non-hydrolysable substituent and b) a silver compound to the surface of the article and treatment with heat and/or radiation to form the silver colloid coating. Articles coated in accordance with the invention are therefore particularly suitable for purposes of disinfection, preservation, cosmetic, pharmaceutical or medical purposes. Articles from the pharmaceutical or medical sector, especially containers for pharmaceuticals or articles or components which come into contact with the human body and are required to be free from germs, are preferred fields of application.

29 Claims, No Drawings

OBJECT HAVING A MICROBICIDE COATING, METHOD FOR THE PRODUCTION THEREOF AND USE OF THE SAME

The present invention relates to microbicidally coated articles, especially containers, whose coating comprises an organically modified inorganic matrix comprising silver colloids, to a method of producing them and to their use for disinfection, preservation or medical purposes.

It is known that silver ions exert a strongly microbicidal effect. The microbicidal effect of the silver ions is also evident when silver compounds are present in a matrix, for example a polymer matrix having a sufficiently free volume, and even when silver colloids have been bound into a matrix. Silver ions must diffuse at a sufficient rate to the surface. To give microbicidal coatings, the silver can be used, for example, in the form of soluble compounds in paint solutions or in the form of silver colloid solutions.

Soluble silver compounds generally have the disadvantage that their diffusion is relatively rapid and their effect is exhausted relatively quickly, especially when in contact with solutions. To produce silver colloid coating compositions, the silver colloids can be mixed into a coating composition. This has the general disadvantage, however, that stable silver colloid solutions are required, whose stability must generally be brought about by electrostatic stabilization (pH stabilization); in other words, protic solvents are needed and it is necessary to set defined pH levels, with the consequence that, for many coating systems, the addition of silver colloids is not possible.

In another method, in a coating composition comprising glass-forming elements, silver colloids are generated in situ from silver compounds during the coating process, giving coatings comprising silver colloids in a glass matrix. A disadvantage of this method, however, is that the coatings formed are brittle and that very high temperatures are needed for the formation of the colloid-containing glass matrix. This method is therefore not suitable for the coating of temperature-sensitive articles.

An object of the present invention is to provide even temperature-sensitive articles with a silver colloid coating, where silver colloids generated in situ can be prepared even at relatively low temperatures and where the curing of the coating can also take place at relatively low temperatures. At the same time, relatively large colloids should be possible, since such colloids have high long-term activity. Moreover, a coating of high elasticity should be possible which can be employed even on articles having a flexible surface.

These requirements are surprisingly met by the microbicidally coated article, in particular a container, according to the present invention, there being present on at least part of the article a coating comprising an organically modified inorganic matrix comprising silver colloids which is obtainable by application of a coating composition comprising a) a hydrolysate or condensate based on at least one hydrolysable silane with at least one non-hydrolysable substituent and b) a silver compound to the surface of the article and treatment with heat and/or radiation to form the silver colloid coating.

The present invention additionally provides a method of producing a microbicidally coated article comprising an organically modified inorganic matrix comprising a silver colloid coating, wherein a coating composition comprising a) a hydrolysate or condensate based on at least one hydrolysable silane with at least one non-hydrolysable substituent and b) a silver compound is applied to at least part of the surface of the article and is treated with heat and/or radiation to form the silver colloid coating.

In accordance with the invention it is possible to obtain silver colloid coatings at low temperatures, so that they are suitable for temperature-sensitive articles. High elasticity of the coat allows the coating of flexible articles. The articles coated in accordance with the invention are distinguished by a strongly microbicidal effect.

The article to be coated may comprise any desired article. On account of the microbicidal activity, the articles coated in accordance with the invention are especially suitable for disinfection, preservation, cosmetic, pharmaceutical and/or medical purposes. For articles in the pharmaceutical or medical sector, for example for coated containers for pharmaceuticals or for articles or components which are intended to come into contact with the human body and remain germ-free, the present invention is particularly suitable.

Preferably, therefore, the article in question is an article for the keeping of solid (e.g. ointment-like), liquid or gaseous media, particularly for keeping liquid media, for example solutions. The containers may comprise, for example, bottles, vials, ampoules, (sealable) pouches, packaging forms, such as blisters, tins, spray bottles or spray cans and tubes. The media for keeping are, in particular, pharmaceuticals, preferably in liquid form, as solutions for example, or other media used in the medical sector, for example isotonic saline solutions and preservation or cleaning media for contact lenses. Containers for nasal sprays and eye drops are particularly preferred. Naturally, the containers may also be used in other fields.

Further preferred articles which are coated in accordance with the invention are articles or instruments or parts thereof used in the medical sector, for example surgical instruments, trays and tubing.

All or part of the article may be coated. For example, it may be appropriate to coat only the inside surfaces of containers such as pharmaceutical vials, while the outer surface remains uncoated. The article may be composed of one or more materials; for example, different components of the article may be composed of different materials.

The article to be coated or the part of the article that is coated (substrate) may be of any desired material, for example of metal glass, ceramic, glass-ceramic, plastic or paper. Since one particular advantage of the present invention is that it is possible to obtain silver colloid coatings without having to employ high temperatures, the invention is particularly suitable for heat-sensitive articles. It is therefore preferred to use articles or parts of articles made of plastic. Examples of plastics are polyethylene, polypropylene, polyacrylate, such as polymethyl methacrylate and polymethyl acrylate, polyvinylbutyral polycarbonate, polyurethanes, ABS copolymers or polyvinyl chloride, particular preference being given to polyethylene. The article may be conventionally pretreated in order, for example, to bring about cleaning, degreasing or better adhesion to the coating. It is of course possible for the part of the article that is to be coated, as the substrate, to be coated separately first and then assembled to form the finished article.

The coating composition used comprises a) a hydrolysate or condensate based on at least one hydrolysable silane with at least one non-hydrolysable (carbon-containing) substituent and b) a silver compound. The hydrolysate or condensate is preferably obtained by partial hydrolysis or condensation of one or more silanes of the general formula (I)

$$R_a SiX_{(4-a)} \quad (I)$$

in which the radicals R are identical or different and represent non-hydrolysable groups, the radicals X are identical or different and denote hydrolysable groups or hydroxyl groups and a has the value 1, 2 or 3, a value of 1 being preferred.

In the organosilanes of the formula (I) the hydrolysable groups X are, for example, hydrogen or halogen (F, Cl, Br or I, especially Cl and Br), alkoxy (preferably $C_{1-6}$ alkoxy, especially $C_{1-4}$ alkoxy, such as methoxy, ethoxy, n-propoxy, isopropoxy, n-butoxy, isobutoxy, sec-butoxy and tert-butoxy), aryloxy preferably $C_{6-10}$ aryloxy, such as phenoxy), acyloxy (preferably $C_{1-6}$ acyloxy, such as acetoxy or propionyloxy), alkylcarbonyl (preferably $C_{2-7}$ alkylcarbonyl, such as acetyl), amino, monoalkylamino or dialkylamino, the alkyl groups having preferably 1 to 12, in particular 1 to 6, carbon atoms. Preferred hydrolysable radicals are halogen, alkoxy groups and acyloxy groups. Particularly preferred hydrolysable radicals are alkoxy groups, especially methoxy and ethoxy.

R is a non-hydrolysable organic radical which may where appropriate carry a functional group. Examples of R are alkyl (preferably $C_{1-6}$ alkyl, such as methyl, ethyl, n-propyl, isopropyl, n-butyl, sec-butyl and tert-butyl, pentyl, hexyl or cyclohexyl), alkenyl (preferably $C_{2-6}$ alkenyl, such as vinyl, 1-propenyl, 2-propenyl and butenyl), alkynyl (preferably $C_{2-6}$ alkynyl, such as acetylenyl and propargyl) and aryl (preferably $C_{6-10}$ aryl, such as phenyl and naphthyl).

Specific examples of functional groups of the radical R, in addition to the aforementioned groups containing unsaturated C—C bonds, are the epoxy, hydroxyl, ether, amino, monoalkylamino, dialykamino, for example with the above-defined $C_{1-6}$ alkyl groups, amide, carboxyl, mercapto, thioethet, vinyl, isocyanate, acryloyloxy, methacryloyloxy, acid anhydride, acid halide, cyano, halogen, aldehyde, alkylcarbonyl, sulfonic acid and phosphoric acid group. These functional groups are attached to the silicon atom via alkylene, alkenylene or arylene bridge groups, which may be interrupted by oxygen or sulfur atoms or by —NH— groups. These bridge groups are derived, for example, from the abovementioned alkyl, alkenyl or aryl radicals. The radicals R contain preferably 1 to 18, especially 1 to 8, carbon atoms. The stated radicals R and X may where appropriate have one or more customary substituents, such as halogen or alkoxy.

At least one of the hydrolysable silanes used having at least one non-hydrolysable substituent preferably contains one of the abovementioned functional groups on the non-hydrolysable substituent. By way of this functional group it is then possible for organic crosslinking to take place, for example by reaction of the functional groups on the silanes with one another, in which case different or the same functional groups may react with one another, or with functional groups on the organic compounds described below, which may likewise be present in the coating composition.

Preferred functional groups are the epoxide, acid anhydride and amino group, particular preference being given to a combination of at least one hydrolysable silane having one or more epoxide groups on at least one non-hydrolysable substituent and of at least one hydrolysable silane having one or more amino groups on at least one non-hydrolysable substituent. An especially preferred combination is one further comprising, in addition to an epoxysilane and an aminosilane, at least one hydrolysable silane having one or more acid anhydride groups on at least one non-hydrolysable substituent.

In the preferred epoxysilanes of the above general formula (I) a has a value of 1, X is preferably $C_{1-4}$ alkoxy, with particular preference methoxy and ethoxy, and R is a non-hydrolysable radical having at least one epoxide group, for example an aliphatic, cycloaliphatic or aromatic radical especially alkylene, for example $C_1$-$C_6$ alkylene, such as methylene, ethylene, propylene and butylene, having at least one epoxide group. The radical R is preferably a glycidyloxy-($C_{1-6}$)-alkylene radical. Specific examples are β-glycidyloxyethyl, γ-glycidyloxypropyl, δ-glycidyloxybutyl, ε-glycidyloxypentyl, ω-glycidyloxyhexyl, and 2-(3,4-epoxycyclohexyl)ethyl. Epoxysilanes used with particular preference are γ-glycidyloxypropyltrimethoxysilane (GPTS) and γ-glycidyloxypropyltriethoxysilane (GPTES).

Preferred aminosilanes are those of the above general formula (I) in which a has a value of 1, X is preferably $C_{1-4}$ alkoxy, with particular preference methoxy and ethoxy, and R is a non-hydrolysable radical having at least one amino group, for example an aliphatic, cycloaliphatic or aromatic radical, especially alkylene, for example $C_1$-$C_6$ alkylene, such as methylene, ethylene, propylene and butylene, having at least one primary, secondary or tertiary amino group. For example, R is an $R^1{}_2$N-(alkylene-$NR^1$)$_x$-alkylene radical in which x is 0 to 5, the alkylene groups may be identical or different and may in particular be those mentioned above, and $R^1$ is identical or different at each occurrence and is hydrogen or an optionally substituted alkyl radical for example those specified in general formula (I) above. $R^1$ may also be a divalent radical, for example alkylene, with the formation of a heterocyclic ring. Where appropriate it is also possible for a further non-hydrolysable radical for example alkyl to be present (a=2). Specific examples of such silanes are 3-aminopropyltrimethoxysilane (APTS), 3-aminopropyltriethoxysilane, N-(2-aminoethyl)-3-aminopropyltrimethoxysilane, N-[N'-(2'-aminoethyl)-2-aminoethyl]-3-aminopropyltrimethoxysilane, N-[3-(triethoxysilyl)propyl]-4,5-dihydroidazole and [N-(2-aminoethyl)-3-aminopropyl]-methyldiethoxysilane.

3-Aminopropyltrimethoxysilane (APTS) is particularly preferred.

Preferred anhydridosilanes are those of the above general formula (I) in which a has a value of 1, X is preferably $C_{1-4}$ alkoxy, with particular preference methoxy and ethoxy, and R is a non-hydrolysable radical having at least one anhydride group, for example an aliphatic, cycloaliphatic or aromatic radical, especially alkylene, for example $C_1$-$C_6$ alkylene, especially $C_1$-$C_4$ alkylene, such as methylene, ethylene, propylene and butylene, having an anhydride group. The anhydride group, which like the epoxide group is capable of condensation with amino groups, may comprise, for example, radicals derived from carboxylic anhydrides, such as succinic anhydride, maleic anhydride or phthalic anhydride, which are connected to the silicon atom via one of the abovementioned radicals, especially $C_1$-$C_4$ alkylene. Examples are [3-(triethoxysilyl)propyl]succinic anhydride (dihydro-3-[3-(triethoxysilyl)propyl]-2,5-furandione, GF20) and [3-(trimethoxysilyl)propyl]succinic anhydride.

Where appropriate it is also possible to use hydrolysable silanes or precondensates thereof containing at least in part organic radicals substituted by fluorine. For this purpose it is possible, for example, to use hydrolysable silicon compounds of the general formula (I) having at least one non-hydrolysable radical R which has, for example, on average from 2 to 30 fluorine atoms attached to carbon atoms which are preferably separated from Si by at least two atoms. Hydrolysable groups which can be used in this context include for example those indicated for X in formula (I). Specific examples of fluorosilanes are $C_2F_5$—$CH_2CH_2$—$SiZ_3$, n-$C_6F_{13}$—$CH_2CH_2$—$SiZ_3$, n-$C_8F_{17}$—

CH$_2$CH$_2$—SiZ$_3$, and n-C$_{10}$F$_{21}$—CH$_2$CH$_2$—SiZ$_3$, where Z=OCH$_3$, OC$_2$H$_5$ or Cl, iso-C$_3$F$_7$O—CH$_2$CH$_2$CH$_2$—SiCl$_2$(CH$_3$), n-C$_6$F$_{13}$—CH$_2$CH$_2$—SiCl$_2$(CH$_3$) and n-C$_6$F$_{13}$—CH$_2$CH$_2$—SiCl(CH$_3$)$_2$. The use of a fluorinated silane of this kind results in hydrophobic and oleophobic properties being given additionally to the coating in question. Silanes of this kind are described in detail in DE 4118184. The fraction of fluorinated silanes is preferably not more than 0.5 to 2% by weight based on the total organically modified inorganic polycondensate used.

Of the hydrolysable silanes having at least one non-hydrolysable substituent which are used for the hydrolysate or condensate, preferably at least 40 mol %, more preferably at least 70 mol %, with particular preference at least 90 mol %, have at least one functional group on at least one non-hydrolysable substituent. In one preferred embodiment all of the hydrolysable silanes having at least one non-hydrolysable substituent that are used possess at least one functional group on at least one non-hydrolysable substituent. In the case of the combined use of epoxysilane, aminosilane and anhydridosilane, the epoxysilane/aminosilane/anhydridosilane ratio is preferably 0.5 to 1.5/1 to 3/1 to 3, based on the functional groups.

For the preparation of the hydrolysate or condensate it is possible where appropriate to use further hydrolysable compounds of an element M as matrix formers. These are, in particular, compounds of at least one element M from main groups III to V and/or transition groups II to IV of the Periodic Table of the Elements. They are preferably hydrolysable compounds of Si, Al, B, Sn, Ti, Zr, V or Zn, especially those of Si, Al, Ti or Zr, or mixtures of two or more of these elements. It should be noted that, of course, other hydrolysable compounds may also be used, particularly those of elements from main groups I and II of the Periodic Table (e.g. Na, K, Ca and Mg) and from transition groups V to VIII of the Periodic Table (e.g. Mn, Cr, Fe and Ni). Hydrolysable compounds of the lanthanides may also be used. These hydrolysable matrix-forming compounds without non-hydrolysable groups have in particular the general formula MX$_b$ (formula (II), where M is as defined above, X is as defined above for formula (I) and b corresponds to the valence of the element M (e.g. SiX$_4$, AlX$_3$). The compounds may also be used in the form of prehydrolysates or precondensates.

Preferably, however, the latter compounds account for not more than 20 mol %, in particular not more than 10 mol %, of the total amount of hydrolysable monomeric compounds employed. With particular preference, not more than 4 mol %, or 0 mol %, of the total hydrolysable monomeric compounds employed have no non-hydrolysable substituent.

The coating composition further comprises at least one silver compound. This may comprise silver compounds soluble in water or organic solvents, such as AgNO$_3$, though preferably the silver ions are used in the form of complex compounds. The complexing agents are with particular preference chelating agents, i.e. bidentate or multidentate ligands, for example bidentate to hexadentate complexing agents. The solvent-soluble silver compound is therefore in particular a complex of silver ions with complexing agents, especially chelating agents. Silver complex compounds of this kind are formed, for example, by adding a silver compound and complexing agent to a solvent, and the silver complex formed is then used in the form of this solution for the coating composition.

The silver(I) ions and/or the silver complex compounds may react under reducing conditions to give metal colloids. Examples of complexing agents which form a silver complex compound with silver(I) ions are halide ions, such as iodide, bromide and especially chloride (or the corresponding hydrohalic acids), thio compounds, thiocyano compounds, sugars, such as pentoses and hexoses, for example glucose, β-dicarbonyl compounds, such as diketones, for example acetylacetonates, keto esters, for example acetoacetates and allyl acetoacetate, ether alcohols, carboxylic acids, carboxylates, for example acetate, citrate or glycolate, betaines, diols, polyols, including polymeric polyols such as polyalkylene glycols, crown ethers, phosphorus compounds, mercapto compounds, such as 3-mercaptopropyltrimethoxysilane and 3-mercaptopropyltriethoxysilane, and amino compounds. Particularly preferred complexing agents used are mercapto compounds, such as mercaptosilanes, amino compounds, such as aminosilanes, mono-, di-, tri- and tetraamines and higher polyamines. Examples of organic amines are triethylenetetramine, diethylenetetramine, diethylenetriamine and ethylenediamine. Examples of aminosilaxes are 3-aminopropyltriethoxysilane, 3-aminopropyltrimethoxysilane and, in particular, 2-aminoethyl-3-aminopropyltrimethoxysil (DIAMO), 2-aminoethyl-3-aminopropyltriethoxysilane, aminohexyl-3-aminopropyltrimethoxysilane and aminohexyl-3-aminopropyltriethoxysilane. It is preferred to use silver diamine complex compounds, with particular suitability being possessed by complexing agents containing at least two amino groups which are able to form chelate complexes. Of the amino complexing agents, the aminosilanes are particularly preferred.

The complexing agents are advantageously incorporated into the matrix as it forms, especially firstly in the form of a weak coordinated bond to Ag$^0$ as it forms and then preferably in the form of a surface modification of the silver colloids formed, which can lead to the stabilization of the silver colloids in the matrix. The surface modification brought about by the complexing agent results in enhanced compatibility between matrix and surface-modified silver colloid. The complexing agents preferably also contain functional or non-functional groups which additionally promote the compatibility of the silver colloids with the matrix. These may be, for example, polar groups (e.g. hydroxyl, amino or carboxyl groups), which promote compatibility with hydrophilic matrices or with the corresponding binder, or apolar groups (e.g. alkyl groups or aryl groups), which promote compatibility with hydrophobic matrices or with the corresponding binder.

Complexing is presumed to be accompanied by partial stabilization of the silver ions, so that no spontaneous or daylight-induced reduction takes place. Surprisingly, following reduction to Ag, accomplished for instance by heat treatment or UV irradiation with oxidation of organic compounds present, the Ag$^0$ is highly mobile despite the surrounding complexing agents, and consequently it is possible for colloids to form, made up of several thousand atoms, for example.

When a complexing agent is used the ratio of Ag to complexing groups present is preferably from 1:0.1 to 1:500, in particular from 1:1 to 1:200. A bidentate complexing agent, for example, has two complexing groups. The complexing agents may also function at least in part as reducing agents for the silver ions. Further suitable reducing agents may be the solvents described below, for example alcohols or ketones, the by-products formed during hydrolysis and condensation, for example alcohols, the hydrolysable compounds employed, or a combination of these.

Where appropriate, the coating composition may also comprise nanoscale inorganic particulate solids. This gives the coating improved mechanical strength (scratch resistance, hardness). Such solids generally possess a particle size in the range from 1 to 300 nm or from 1 to 100 nm, preferably from 2 to 50 nm and with particular preference from 5 to 20 nm. This material may be used in the form of a powder but is preferably used in the form of a stabilized sol, especially an acidically or alkalinically stabilized sol. The nanoscale inorganic particulate solids may be composed of any desired inorganic materials but are composed in particular of metals or metal compounds such as, for example, (unhydrated or hydrated) oxides such as ZnO, CdO, $SiO_2$, $TiO_2$, $ZrO_2$, $CeO_2$, $SnO_2$, $Al_2O_3$, $In_2O_3$, $La_2O_3$, $Fe_2O_3$, $Cu_2O$, $Ta_2O_5$, $Nb_2O_5$, $V_2O_5$, $MoO_3$ or $WO_3$, chalcogenides, nitrides, phosphides, phosphates, silicates, zirconates, aluminates or carbides. The nanoscale inorganic particulate solids preferably comprise an oxide, oxide hydrate, nitride or carbide of Si, Al, B, Zn, Cd, Ti, Zr, Ce, Sn, In, La, Fe, Cu, Ta, Nb, V, Mo or W, with particular preference of Si, Al, B, Ti and Zr. It is particularly preferred to use oxides or oxide hydrates. Preferred nanoscale inorganic particulate solids are $SiO_2$, $Al_2O_3$, ITO, ATO, AlOOH, $ZrO_2$ and $TiO_2$. Examples of nanoscale $SiO_2$ particles are commercial silica products, for example silica sols, such as the Levasils®, silica sols from Bayer AG, or pyrogenic silicas, for example the Aerosil products from Degussa.

The nanoscale inorganic particulate solids may be modified with organic surface groups. The surface modification of nanoscale particulate solids is a method known in the state of the art, and is described, for example, in WO 93/21127 (DE 4212633) and WO 98/51747 (DE 19746885).

The coating composition may comprise further additives which in the art are normally added according to intended purpose and desired properties. Specific examples are organic compounds, crosslinking agents, solvents, organic and inorganic color pigments, dyes, UV absorbers, lubricants, leveling agents, wetting agents, adhesion promoters and initiators. The initiator may serve for thermally or photochemically induced crosslinking.

Where appropriate it is possible for organic compounds or crosslinking agents to be added to the coating composition. These may be organic monomers, oligomers or polymers which in particular contain at least two functional groups which are able to react with the functional groups of the hydrolysable silanes used, with the formation of an organic crosslink. Examples of the compounds involved include aliphatic, cycloaliphatic and aromatic compounds. Preference is given to using organic compounds having at least two epoxide groups or at least two amino groups. The use of the organic compounds may be advantageous, for example, on price grounds. The organic compound is used in particular in an amount of not more than 30% by weight Organic epoxide compounds that can be used may be derived, for example, from aliphatic, cycloaliphatic or aromatic esters or ethers or mixtures thereof, based for example on ethylene glycol 1,4-butanediol propylene glycol 1,6-hexanediol cyclohexanedimethanol, pentaerythritol, bisphenol A, bisphenol F or glycerol. Specific examples of organic compounds having at least two epoxide groups are 3,4-epoxycyclohexylmethyl 3,4-epoxycyclohexanecarboxylate, bis(3,4-epoxycyclohexyl) adipate, 1,4-butanediol diglycidyl ether, cyclohexanedimethanol diglycidyl ether, glycerol triglycidyl ether, neopentyl glycol diglycidyl ether, pentaerythdritol polyglycidyl ether, 2-ethylhexyl glycidyl ether, 1,6-hexanediol diglycidyl ether, propylene glycol diglycidyl ether, polypropylene glycol diglycidyl ether, bisphenol A diglycidyl ether, bisphenol F diglycidyl ether, epoxy resins based on bisphenol A, epoxy resins based on bisphenol F and epoxy resins based on bisphenol A/F. Specific examples of organic compounds having at least two amino groups are 1,3-diaminopentane, 1,5-diamino-2-methylpentane, 1,4-diaminocyclohexane, 1,6-diaminohexane, diethylenediamine, triethylenetetramine or isophoronediamine. It is of course also possible to use organic compounds which carry different functional groups.

Examples of suitable solvents are alcohols, preferably lower aliphatic alcohols, such as methanol, ethanol, 1-propanol, isopropanol and 1-butanol, ketones, preferably lower dialkyl ketones such as acetone and methyl isobutyl ketone, ethers, preferably lower dialkyl ethers, such as diethyl ether, dibutyl ether and THF, isopropoxyethanol, aromatic hydrocarbons, such as toluene and xylene, esters, such as ethyl acetate, butoxyethanol, chlorinated hydrocarbons, such as chloroform, sulfoxides, sulfones, amides, such as dimethylformamide and dimethylacetamide, and mixtures thereof. In principle it is not necessary to use a solvent, especially when the hydrolysis of the hydrolysable silanes leads to the formation of alcohols, such as those mentioned above. Even in that case, however, it is of course possible to use a solvent.

With regard to the selection of the solvent it should be ensured that the silver compound or silver complex compound present in the coating composition is preferably soluble in the solvent. For this reason it is often advantageous to use as solvent a solvent or solvent mixture which comprises water or another polar solvent, such as a $C_1$-$C_4$ alcohol, for example methanol, ethanol, n-propanol, isopropanol, isobutanol or n-butanol or acetone. The silver complex compound may first be formed in a solvent and added as a solution to the coating composition, which may also comprise another solvent.

The hydrolysable compounds are hydrolysed or (pre) condensed in particular by the sol-gel method. The sol-gel method is a method familiar to the person skilled in the art. The hydrolysis or condensation is conducted either in the absence of a solvent or, preferably, in an aqueous or aqueous/organic reaction medium, where appropriate in the presence of an acidic or basic condensation catalyst such as HCl, $HNO_3$ or $NH_3$. Partial hydrolysis or (poly)condensation of the hydrolysable compounds (precondensate) is obtained. The degree of condensation, like the viscosity, can be adjusted appropriately, by means of the solvent, for example. The liquid sol obtained in this way is used to prepare the coating composition. The silver compound, in the form for example of the complex compound, and the other components may then be added. Naturally, the silver compounds, the complexing agent and the other components may also be added, in any order, prior to the hydrolysis or condensation.

The coating composition can be applied to the surface of the article in any customary manner. Any common wet-chemical coating methods may be used. Examples are centrifugal coating, (electro-)dip coating, knife coating, spraying, squirting, spinning, drawing, spincoating, pouring, rolling, brushing, flow coating, film casting, blade casting, slotcoating, meniscus coating, curtain coating, roller application or customary printing methods, such as screen printing or flexographic printing. The amount of coating composition applied is chosen so as to give the desired coat thickness. Work is carried out, for example, so as to give dry coat thicknesses in the range from 1 to 15 µm and preferably from 2 to 5 µm. An advantage in the case of the present invention is that the coat thicknesses can be chosen very variably.

Application of the coating composition to the article is followed where appropriate by drying, for example at ambient temperature (below 40° C.).

The optionally predried coating is subjected to treatment with heat and/or radiation, in the course of which the silver colloids are formed. It has been found that by virtue of the coating composition used in accordance with the invention the silver colloids are surprisingly formed from the silver compounds even at low temperatures. The treatment may either be a heat treatment or an irradiation. In one preferred embodiment there is a combined treatment with heat and radiation.

The formation of the silver colloids takes place in particular at temperatures of below 200° C., especially below 130° C., below 100° C., and even as low as below 80° C. With heat treatment alone, for example, the silver colloids are formed in the range from 50 to 100° C., preferably from 60 to 80° C. or 70 to 80° C. The silver colloids may also be formed photochemically at ambient temperature by irradiation only. Irradiation is carried out using actinic radiation, for example UV or laser radiation or electron beams, in order to form the silver colloids. For irradiation it is particularly preferred to use UV radiation.

Preferably, irradiation is carried out at the same time as heat treatment. In this case the irradiation, in particular TV irradiation, takes place at a temperature of from 50 to 100° C., in particular from 60 to 80° C. This combined treatment takes place, for example, over a period of 2-20 minutes. In the case of the corresponding treatment without irradiation, the period of treatment is prolonged by a factor of 1.2-2.

It is particularly important that the colloids generated are relatively large, for example with diameters of 5-50 nm, 5-30 nm or 5-20 nm, and in particular 10-20 nm, since these result in a high long-term activity. Surprisingly it has been found that, by means of the UV radiation and heat treatment, silver colloids having a diameter of, for example, 10 to 50 nm or 10 to 30 nm are formed particularly rapidly, even if the silver is added to the composition in the form of a silver diamine complex. Without UV irradiation, the heat treatment produces smaller Ag colloids (e.g. 5-20 nm). The silver colloids are formed, so to speak, in situ in the applied coating, accompanied where appropriate by the first (further) condensation and crosslinking reaction as the coating begins to cure.

The amount of silver compound used in the coating composition depends on the desired concentration of silver colloids.

Curing of the coating composition to give the silver colloid coating may take place at temperatures below 300° C., preferably not more than 200° C. and in particular not more than 130° C. Curing is preferably effected simply by continuing the heat treatment for the formation of silver colloids, i.e., for instance, at temperatures below 100° C. or below 80° C., for example at temperatures of from 50 to 100° C. or 60 to 80° C. The duration of curing may be several hours, for example more than 2 hours, or more. Naturally, the time is shortened if the temperature is raised. Formation of the silver colloids at low temperatures makes it possible advantageously to prevent rapid curing of the coating, which takes place at the relatively high temperatures otherwise required, so that the colloids are given time to form. Furthermore, initial condensation processes and/or crosslinking reactions take place in the coating as early as during the heat treatment to form the colloids, leading to an increased viscosity which contributes to the stabilization of the silver colloids. Where appropriate, photochemical curing is also possible.

The coating obtained comprises an organically modified inorganic matrix: in other words, in addition to the inorganic matrix framework, there are organic side groups, which may have undergone crosslinking with one another or by way of organic compounds, or there may be other organic constituents. By increasing the temperature it is possible to reduce the organic fraction.

By virtue of the method of the invention it is possible, then, to prepare coating compositions which as yet contain no silver colloids, to use these compositions to coat substrates, especially plastic substrates, and, by treatment with heat and/or radiation, to prepare silver colloids of the desired size and in the desired concentration of several % by weight. For example, from 0.1 to 40% by weight and in particular from 1 to 10% by weight of silver colloids may be present in the finished coating. The coating can be obtained at low temperatures, so that even temperature-sensitive substrates, for example temperature-sensitive plastics, may readily be coated with it. Moreover, the coatings display very good elasticity, so that even flexible substrates which readily undergo (reversible) deformation under pressure can be coated.

The coated articles of the invention exhibit a strongly biocidal effect even over prolonged periods of time, especially in contact with liquid media. This produces, in particular, microbicidal coatings on various substrates in contact with solutions, with an activity of several months. It has been found that the use of such coatings on medicine vials which come into contact with the eyes or nose prevents any bacterial contamination.

The articles coated in accordance with the invention are therefore particularly suitable for purposes of disinfection, preservation, cosmetic, pharmaceutical or medical purposes. Articles from the pharmaceutical or medical sector, especially containers for pharmaceuticals or articles or components which come into contact with the human body and are required to be free from germs, are preferred fields of application.

The examples which follow illustrate the invention without restricting it.

EXAMPLE 1

Production of a Bactericidally Coated Substrate with Thermal Curing a) Synthesis of the Silver Complex Solution:

0.28 g of silver nitrate is dissolved in 30 g of ethanol (96%). After 30 minutes of stirring, 13 g of isopropanol and 4 g of acetone are added and stirring is continued for 15 minutes. To form the complex, 1.7 g of N-(2-aminoethyl)-3-aminopropyltrimethoxysilane are added slowly dropwise with vigorous stirring.

b) Synthesis of the Coating Composition:

0.03 mol of 3-glycidyloxypropyltrimethoxysilane (GPTMS) (7.09 g) is prehydrolysed with 4.05 g of 0.01 N nitric acid at room temperature for two hours. 0.07 mol of dihydro-3-[3-(triethoxysilyl)propyl]-2,5-furandione (GF20) is introduced as an initial charge and 0.07 mol of 3-aminopropyltrimethoxysilane (APTMS) is added slowly dropwise with ice cooling and vigorous stirring. The mixture is then diluted with 33.9 g of isopropoxyethanol (IPE) and stirred at room temperature for 30 minutes. 18.90 g of 0.01 N nitric acid are added and the mixture is stirred at room temperature for 15 minutes. It is then diluted with 43.3 g of IPE and the GPTMS prehydrolysate is incorporated by stirring. After 15 minutes of stirring, 28.38 g of the silver complex solution prepared in a) are added and stirring is continued at room temperature for 15 minutes.

c) Application and Treatment:

Application to the substrate may take place, for example, by dipping, flooding or spinning. The coats are cured at 130° C. for one hour on glass and at 80° C. for 6 hours on PE.

EXAMPLE 2

Production of a Bactericidally Coated Substrate with Photochemically Generated Silver Colloids 0.03 mol of 3-glycidyloxypropyltrimethoxysilane (GPTMS) is prehydrolysed with 4.05 g of 0.01 N nitric acid at room temperature for two hours. 0.07 mol of dihydro-3-[3-(triethoxysilyl)propyl]-2,5-furandione (GF20) is introduced as an initial charge and 0.07 mol of 3-aminopropyltrimethoxysilane (APTMS) is added slowly dropwise with ice cooling and vigorous string. The mixture is then diluted with 33.9 g of isopropoxyethanol (IPE) and stirred at room temperature for 30 minutes. 18.90 g of 0.01 N nitric acid are added and the mixture is stirred at room temperature for 15 minutes. It is then diluted with 43.3 g of IPE and the GPTMS prehydrolysate is incorporated by stirring. After 15 minutes of stirring, 28.38 g of the silver complex solution prepared in Example 1a) are added and stirring is continued at room temperature for 15 minutes. The application of the coating composition to a substrate may take place, for example, by dipping, flooding or spinning. To generate the Ag colloids, the coated substrate is exposed three times in the UV curing station from Beltron, with both lamps at half-power, and at a speed of 0.8 m/min. Following UV exposure, the coats on glass are cured at 130° C. for one hour and those on PE at 80° C. for 6 hours.

EXAMPLE 3

Production of a Bactericidally Coated Substrate Comprising a Water-Based System with Photochemically Generated Silver Colloids 0.5 mol of 3-glycidyloxypropyltriethoxysilane GPTES (139.21 g) is hydrolysed with 1.5 mol of 0.1 N hydrochloric acid (27 g) at room temperature for 5 hours. The ethanol formed is stripped off on a rotary evaporator at 40 mbar with a bath temperature of 35° C. Then 463.0 g of Levasil® 200 S (silica sol) are incorporated with stirring at room temperature for 16 hours. 5 mol % (based on GPTES) of N-(2-aminoethyl)-3-aminopropyltrimethoxysilane (DIAMO) (5.56 g) are added slowly dropwise with vigorous stirring and incorporated with stirring for one hour. 326.7 g (0.05 mol of Ag) of the silver complex solution prepared in Example 1a) are added to the sol and incorporated with string for 30 minutes. The silver-containing sol is then filtered through a 5 μm filter. The application of the coating composition to a substrate may take place, for example, by dipping, flooding or spinning. To generate the silver colloids, the coated substrates are exposed three times in the UV curing station (type 60/II) from Beltron, with both lamps at half-power, and at a belt speed of 3 m/min. The exposed coats (on steel or aluminum, for example) are cured at 130° C. for four hours.

We claim:

1. An article having on at least a part of its surface a microbicidal coating comprising a colloid of elemental silver in an organically modified inorganic matrix, which coating is provided by a process comprising:

(a) applying to at least a part of the surface of the article a coating composition that comprises a silver complex compound and a hydrolysate or condensate prepared by a sol-gel method and comprising units derived from at least one hydrolysable silane with at least one non-hydrolysable substituent; and (b) treating the applied coating composition with at least one of heat and radiation to form the microbicidal coating.

2. The article of claim 1, wherein the article, on at least a coated part of its surface, is composed of plastic or has a plastic surface.

3. The article of claim 1, wherein the at least one hydrolysable silane comprises at least one silane of the formula $R_aSiX_{(4-a)}$ where each R independently is a non-hydrolysable group, each X independently is a hydrolysable group or a hydroxyl group and a is 1, 2 or 3.

4. The article of claim 3, wherein a is 1.

5. The article of claim 1, wherein the hydrolysate or condensate comprises units derived from:

a) at least one hydrolysable silane having at least one epoxide group on at least one non-hydrolysable substituent;

b) at least one hydrolysable silane having at least one amino group on at least one non-hydrolysable substituent; and c) at least one hydrolysable silane having at least one acid anhydride group on at least one non-hydrolysable substituent.

6. The article of claim 1, wherein the coating comprises from 0.1 to 40% by weight of silver colloid.

7. The article of claim 6, wherein the coating comprises from 1 to 10% by weight of silver colloid.

8. A container having on at least a part of its surface a microbicidal coating comprising a silver colloid in an organically modified inorganic matrix, which coating is provided by a process comprising:

(a) applying to at least a part of the surface of the container a coating composition that comprises a silver complex compound and a hydrolysate or condensate comprising units derived from at least one hydrolysable silane with at least one non-hydrolysable substituent; and (b) treating the applied coating composition with at least one of heat and radiation to form the microbicidal coating.

9. The container of claim 8, wherein the container, on at least a coated part of its surface, is composed of plastic or has a plastic surface.

10. The container of claim 8, wherein the at least one hydrolysable silane comprises at least one silane of the formula $R_aSiX_{(4-a)}$ where each R independently is a non-hydrolysable group, each X independently is a hydrolysable group or a hydroxyl group and a is 1, 2 or 3.

11. The container of claim 8, wherein the hydrolysate or condensate comprises units derived from:

a) at least one hydrolysable silane having at least one epoxide group on at least one non-hydrolysable substituent;

b) at least one hydrolysable silane having at least one amino group on at least one non-hydrolysable substituent; and c) at least one hydrolysable silane having at least one acid anhydride group on at least one non-hydrolysable substituent.

12. The container of claim 8, wherein the silver complex compound comprises a silver diamine complex compound.

13. The container of claim 12, wherein the silver diamine complex compound comprises a complex of silver with at least one of N-(2-aminoethyl)-3-aminopropyltrimethoxysilane, N-(2-aminoethyl)-3-aminopropyl-triethoxysilane, N-(aminohexyl)-3-aminopropyltriethoxysilane and N-(aminohexyl)-3-aminopropyl-trimethoxysilane.

14. The container of claim 8, wherein the container comprises at least one of a bottle, a vial, an ampoule, a pouch, a blister package, a tin, a spray bottle, a spray can and a tube.

15. An article having on at least a part of its surface a microbicidal coating comprising a silver colloid in an organically modified inorganic matrix, which coating is provided by a process comprising:
  (a) applying to at least a part of the surface of the article a coating composition that comprises a silver diamine complex compound and a hydrolysate or condensate comprising units derived from at least one hydrolysable silane with at least one non-hydrolysable substituent; and
  (b) treating the applied coating composition with at least one of heat and radiation to form the microbicidal coating.

16. The article of claim 15, wherein the article, on at least a coated part of its surface, is composed of plastic or has a plastic surface.

17. The article of claim 15, wherein the at least one hydrolysable silane comprises at least one silane of the formula $R_aSiX_{(4-a)}$ where each R independently is a non-hydrolysable group, each X independently is a hydrolysable group or a hydroxyl group and a is 1, 2 or 3.

18. The article of claim 17, wherein a is 1.

19. The article of claim 15, wherein the hydrolysate or condensate comprises units derived from:
  a) at least one hydrolysable silane having at least one epoxide group on at least one non-hydrolysable substituent;
  b) at least one hydrolysable silane having at least one amino group on at least one non-hydrolysable substituent; and
  c) at least one hydrolysable silane having at least one acid anhydride group on at least one non-hydrolysable substituent.

20. The article of claim 15, wherein the silver diamine complex compound comprises a complex of silver with at least one of N-(2-aminoethyl)-3-aminopropyltrimethoxysilane, N-(2-aminoethyl)-3-aminopropyl-triethoxysilane, N-(aminohexyl)-3-aminopropyltriethoxysilane and N-(aminohexyl)-3-aminopropyl-trimethoxysilane.

21. A method of producing the article of claim 1, wherein the method comprises:
  (a) applying to at least a part of the surface of the article a coating composition that comprises a silver complex compound and a hydrolysate or condensate prepared by a sol-gel method and comprising units derived from at least one hydrolysable silane with at least one non-hydrolysable substituent; and
  (b) treating the applied coating composition with at least one of heat and radiation to form the microbicidal coating.

22. The method of claim 21, wherein (b) is conducted at a temperature below 200° C.

23. The method of claim 21, wherein (b) is conducted at a temperature of not higher than 130° C.

24. The method of claim 21, wherein (b) is conducted at a temperature of 50-100° C.

25. The method of claim 21, wherein (b) comprises a treatment with UV radiation.

26. The method of claim 25, wherein (b) comprises a treatment with UV radiation and heat.

27. A method of disinfecting or preserving a solid or liquid substance, wherein the method comprises contacting the substance with the article of claim 1.

28. A method of storing a solid or liquid substance, wherein the method comprises storing the substance in the container of claim 8.

29. The method of claim 28, wherein the substance comprises a pharmaceutical.

* * * * *